Jan. 14, 1930.                J. KIEWICZ                1,743,356
                    THREAD TRIMMER FOR SEWING MACHINES
                    Filed Feb. 17, 1927        6 Sheets-Sheet 3
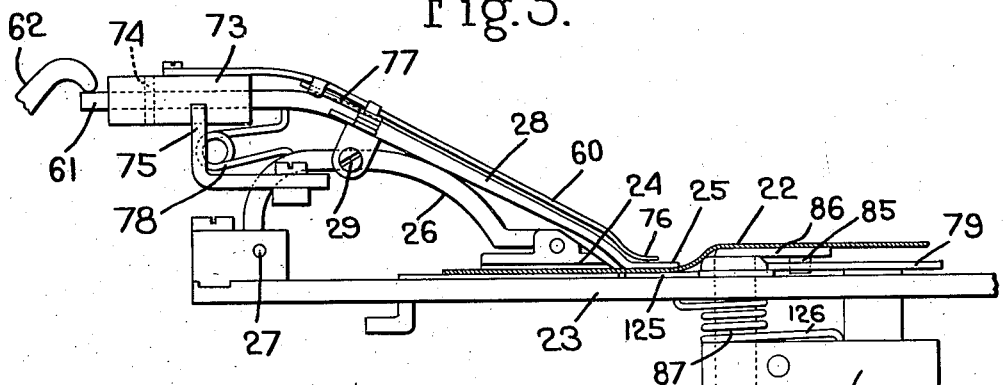
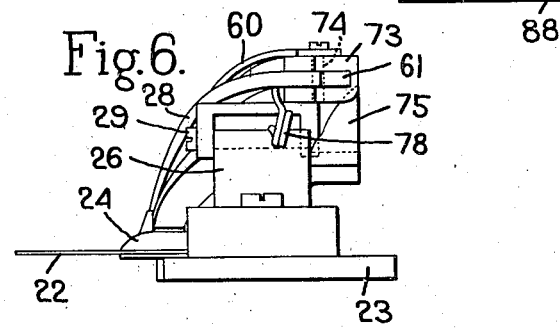
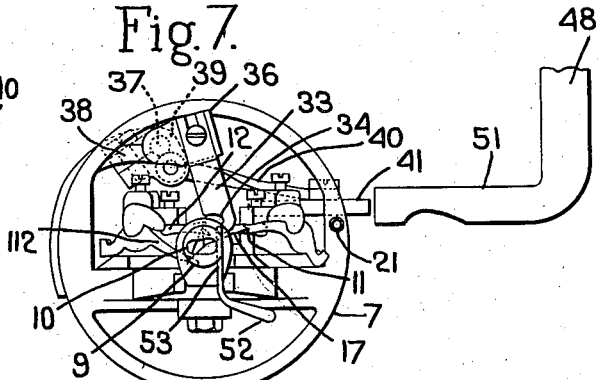
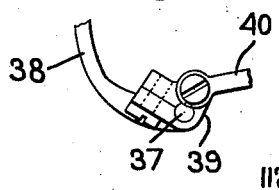
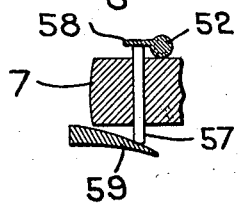
Inventor.
John Kiewicz
by Heard Smith & Tennant.
Attys.

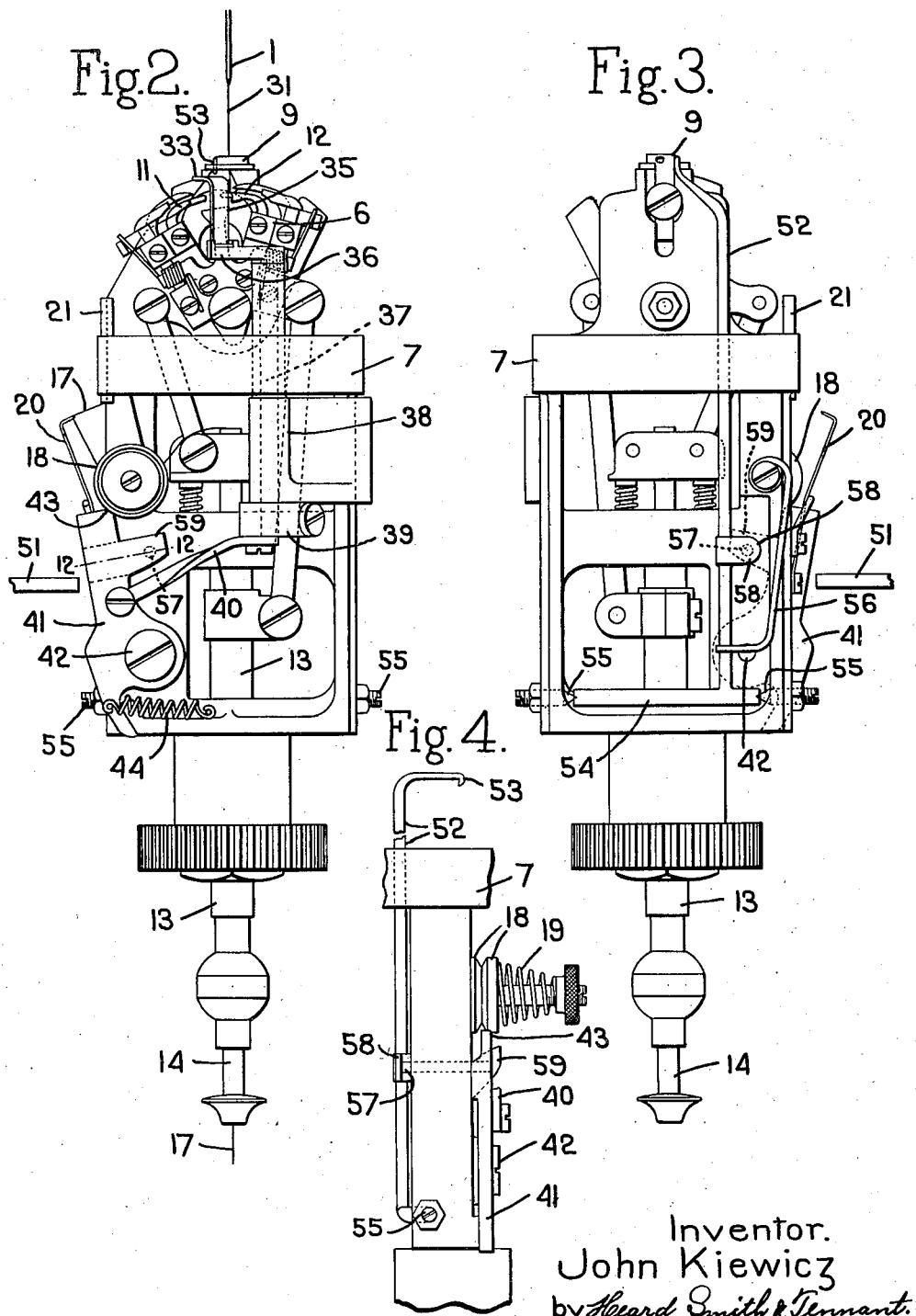

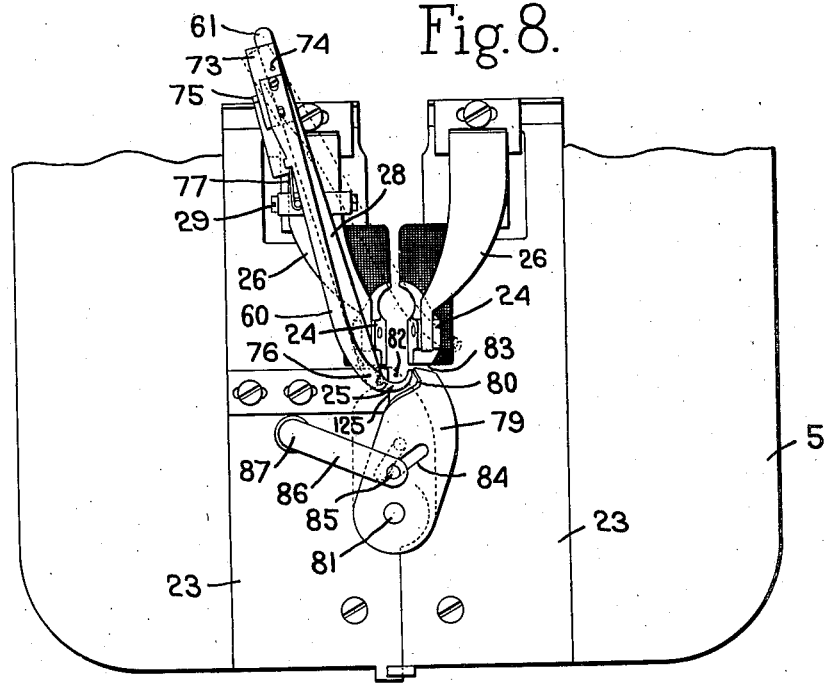
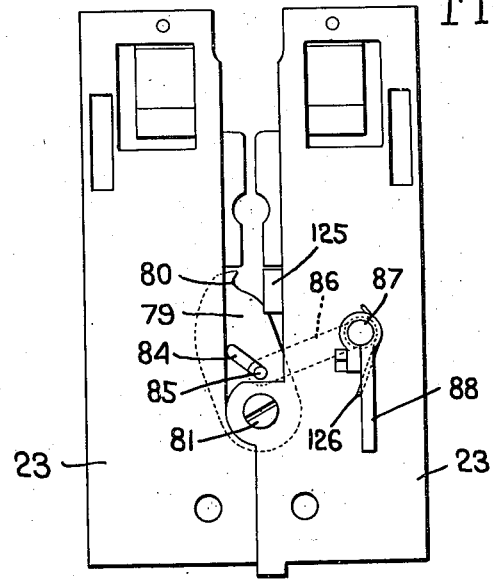

Jan. 14, 1930.  J. KIEWICZ  1,743,356
THREAD TRIMMER FOR SEWING MACHINES
Filed Feb. 17, 1927  6 Sheets-Sheet 5

Inventor.
John Kiewicz
by Heard Smith & Tennant.
Attys.

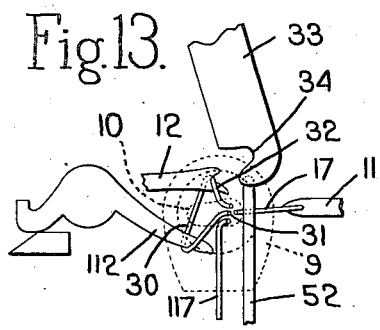
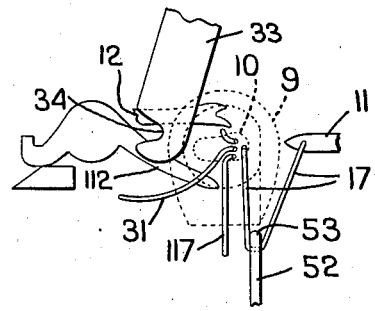
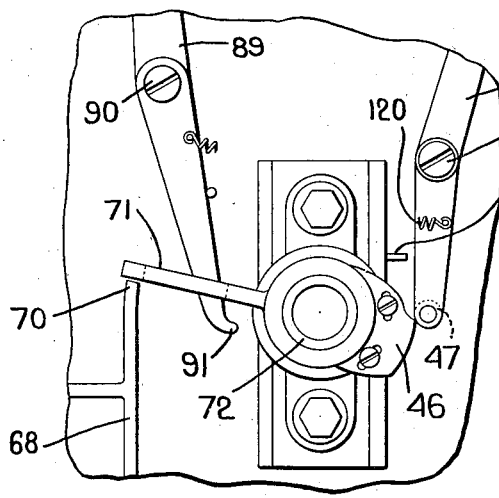
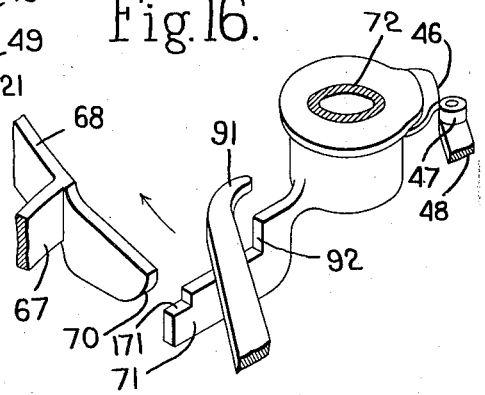
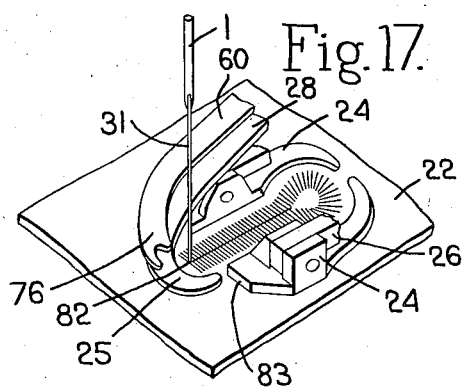
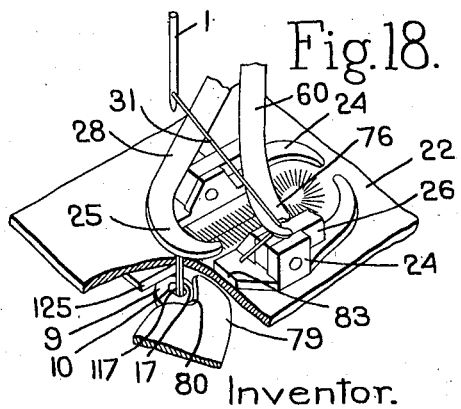
Inventor.
John Kiewicz
by Heard Smith & Tennant.
Attys.

Patented Jan. 14, 1930

1,743,356

UNITED STATES PATENT OFFICE

JOHN KIEWICZ, OF BOSTON, MASSACHUSETTS, ASSIGNOR TO THE REECE BUTTON HOLE MACHINE COMPANY, OF BOSTON, MASSACHUSETTS, A CORPORATION OF MAINE

THREAD TRIMMER FOR SEWING MACHINES

Application filed February 17, 1927. Serial No. 169,052.

This invention relates to sewing machines of the type adapted to sew a short seam and then come to rest and which is provided with means for trimming the thread at the end of the seam.

The invention is shown as embodied in a two-thread buttonhole sewing machine of the type in which the stitch-forming mechanism and work-holding means not only have a relative movement while the stitches are being formed along the sides of the buttonhole but also have a relative movement after the sewing operation is completed and the stitch-forming mechanism has come to rest thereby to carry the parts relatively from stitching position to buttonhole cutting position.

One of the objects of my present invention is to provide a novel means for cutting the upper thread, the under thread and the stay cord, if one is used, at the end of the sewing operation and before the work-holding means and stitch-forming mechanism have their relative movement from stitching to buttonhole cutting position.

A further object of the invention is to provide a novel means for cutting the thread as above described while the work is still held in the work-holding means.

Still another object of the invention is to provide a novel thread-trimming means constructed so that not only is the thread cut as above described but a sufficient length of both upper thread and under thread is pulled off to ensure the proper formation of the first stitch at the beginning of a sewing operation.

The type of buttonhole sewing machine in which the invention is herein shown as embodied has the usual needle operating from above the work, an under thread manipulating mechanism carried by a turret beneath the work and comprising looper devices arranged to take loops of needle thread and present them properly to receive the needle during its penetrating thrust. When the stitch-forming mechanism is brought to rest at the end of the stitching operation the needle is raised and a loop of needle thread is retained by the looper devices of the under thread manipulating mechanism.

In accordance with this invention the upper thread is cut by severing the side or leg of the loop of needle thread which leads to the work thus leaving beneath the work the length of needle thread which formerly constituted the loop of needle thread that was carried by the looper. As soon as one leg of this loop has been cut the needle thread is acted on between the needle and the work by a pull-off device which pulls back out of the work this length of needle thread thus leaving a sufficient length of needle thread projecting through the eye of the needle to ensure the proper formation of the first stitch when the stitching operating is started again.

The under thread, and the stay cord, if one is used, are cut immediately after the stitching operation has been completed and while the work is in the position it occupies at the time of the forming of the last stitch, that is, before the stitch-forming mechanism and work-holding means have their relative movement to carry the parts relatively to buttonhole cutting position. The construction is such that the cutting of the under thread and stay cord is done directly beneath the work and between the latter and the throat plate and while the work is still retained in position by the work-holding means.

In order to give an understanding of the invention I have illustrated in the drawings a selected embodiment thereof which will now be described after which the novel features will be pointed out in the appended claims.

Figs. 2 and 3 are views of the turret which carries the under thread manipulating mechanism, Fig. 2 showing one side of the turret and Fig. 3 the other;

Fig. 4 is a fragmentary view showing the pull-off for the under thread;

Fig. 5 is a fragmentary side view showing the clamps for holding the upper thread and the upper thread pull-off;

Fig. 6 is an end view of Fig. 5;

Fig. 7 is a plan view of the turret;

Fig. 8 is a plan view of the work holder showing the cutter for the under thread and cord and the pull-off for the upper thread;

Fig. 9 is an under side view of Fig. 8;

Fig. 11 is a fragmentary view showing the means for rocking the shaft carrying the upper thread cutter;

Fig. 12 is a section on the line 12—12, Fig. 2;

Figs. 13 and 14 are diagram views illustrating the operation of the cutter for cutting the upper thread and the pull-off for the lower thread;

Fig. 15 is a fragmentary view illustrating the cam devices for actuating the various cutter devices;

Fig. 16 is a fragmentary perspective view of the same cam mechanism;

Figs. 17 and 18 are perspective views more or less diagrammatic illustrating the operation of the upper thread pull-off and the under thread cutter.

Figure 1:
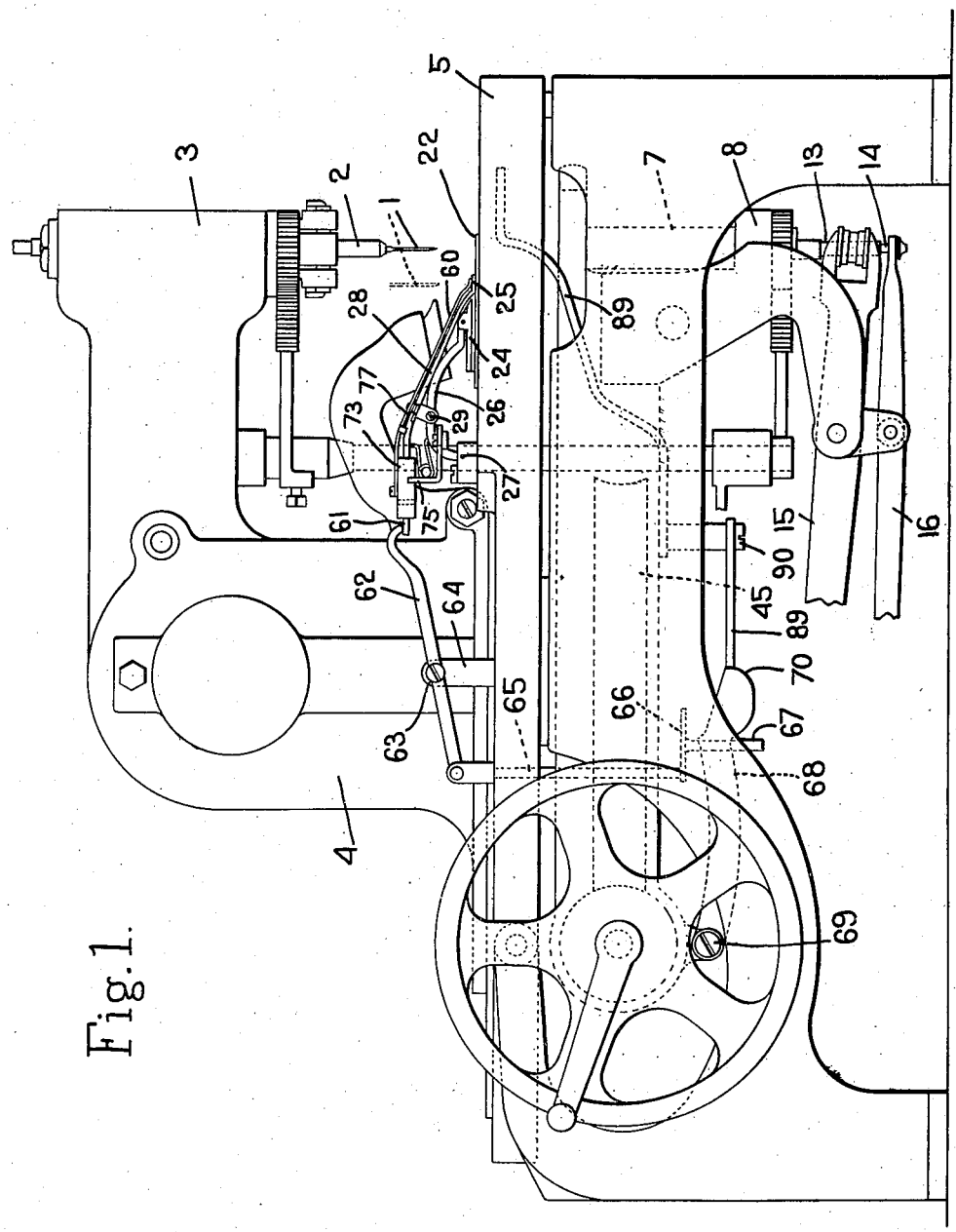
Fig. 1 is a side view of a sewing machine embodying my invention.

As stated above the invention is herein shown as embodied in a buttonhole sewing machine having the usual work-holding means and stitch-forming mechanism which are movable relative to each other for producing the stitches along the sides of the buttonhole. The stitch-forming mechanism in the machine herein shown is of that known type comprising upper thread manipulating mechanism in the form of a needle operating from above the work and under thread manipulating mechanism which is mounted on a turret situated beneath the work and which is turned at each end of the buttonhole to carry the stitching around the end of the buttonhole.

The needle is indicated at 1, it being carried by a needle bar 2 which reciprocates vertically in the head 3 of the frame 4, this frame being mounted on the bed 5. The under thread manipulating mechanism, which is indicated generally at 6, is carried by a turret 7 that is journalled in bearings 8 carried by the frame 4 beneath the bed 5, said turret having the usual throat plate 9 at its upper end which is provided with the sewing opening 10 through which the needle 1 operates and through which the under thread 17 and stay cord 117, if one is used, are led to the work.

The under thread manipulating mechanism is of the Reece type illustrated in United States Patents No. 1,352,280, dated September 7th, 1920, No. 1,595,789, dated August 10th, 1926, and No. 1,606,303, dated November 9th, 1926, it comprising two oscillatory loopers 11, 12 and their looper spreaders which alternately take loops of needle thread and spread said loops and then place them in position to receive the next thrust of the needle. This looper mechanism and loop-spreading mechanism receive their motions from vertically-reciprocating sleeves 13 and 14 situated axially of the turret and actuated from the main driving shaft by levers 15, 16 all as usual in sewing machines of this type. The under thread 17 extends upwardly through the sleeve 14 and thence passes to a tension device which is in the form of the usual tension disks 18 yieldingly pressed together by a spring 19 and from the tension device the thread passes through the eye of a yielding take-up finger 20 and through a guide sleeve 21 to one of the loopers.

The work-holding means by which the work 22 is held comprises the usual clamp plates 23 carried by the bed 5 and work-clamping means adapted to clamp the work to the plates. In the present embodiment of the invention the work-clamping means comprises two clamping feet 24 adapted to engage the work either side of the buttonhole and an additional clamping foot 25 which engages the work adjacent the end of the buttonhole. The clamping feet 24 are carried by arms 26 that are pivoted to the clamp plates at 27 as usual in devices of this type, and they may be closed onto the work or released from the work by mechanism usually employed for this purpose and such as shown in Patent No. 1,352,280, dated September 7th, 1920. The third or auxiliary clamping foot 25 is carried on the end of a lever or arm 28 which is pivoted on one of the arms 26 as shown at 29, said clamping foot 25 being constructed so that it can be released from the work independently of the clamping feet 24 all as will be more fully hereinafter set forth.

The sewing machine herein illustrated is of that type in which when the sewing operation is completed and the stitch-forming mechanism comes to rest with the needle 1 raised there will be a loop of needle thread engaged by the looper mechanism beneath the work, the needle thread extending from the needle through the work at the point where the last stitch was formed thence around the looper mechanism and back to the work. Buttonhole sewing machines of this type are commonly made so that when the buttonhole is completed and the stitch-forming mechanism has come to rest, said stitch-forming mechanism and work-holding means have a relative movement to carry the parts relatively from stitching position to buttonhole cutting position. This relative movement is derived in usual way from the operation of the main cam 45 which controls the operation of the machine.

The thread-cutting device herein illustrated operates to cut the thread after the sewing operation is completed but before said relative movement occurs by which the parts are carried relatively to buttonhole cutting position. In other words, the thread is cut while the stitch-forming mechanism and work-holding means are relatively in the position they occupy when the last stitch of the buttonhole was formed. The cutting of the thread involves first the operation of cutting that side of the loop of needle thread which leads to the work and simultaneously releasing the tension on the under thread and pulling off a length of under thread without cutting it and then pulling back through the work the cut end of needle thread and then cutting the under thread and the stay cord, if one is used, beneath the work and between the work and the throat plate, all of these operations occurring while the work is in the position it occupied at the formation of the last stitch and before the parts are carried to buttonhole cutting position.

Fig. 13 illustrates the position of the looper mechanism when the stitch-forming mechanism comes to rest at the end of the sewing operation, a loop 30 of the needle thread 31 being engaged by the looper 12 and its spreader 112, the side 32 of the loop being that which extends to the work and the other side extending through the work to the needle. The thread cutter for cutting the side 32 of the loop 30 is indicated at 33, it being in the form of a horizontally-extending arm having a cutting edge 34 and provided with a downwardly depending shank 35 which is secured to an arm 36 at the upper end of a rock shaft 37, said shaft being journalled in suitable bearings 38 carried by the turret. The arm 33 is situated directly below the throat plate 9 and is so constructed that when the machine comes to rest the side 32 of the needle thread loop will be in position to be engaged by the cutting edge 34 as the cutter arm 33 is swung from the position shown in Fig. 13 to that shown in Fig. 14, such movement severing the leg 32 of the loop 30 as will be obvious.

After the needle thread is cut said thread is acted on between the needle and the work by a pull-off device which pulls the loop of needle thread back through the work thus leaving a sufficient length of needle thread projecting from the eye of the needle 1 to ensure the proper formation of the first stitch at the beginning of the next sewing operation. The pull-off device will be presently described.

At the same time that the loop of needle thread is cut the under thread tension 18 is released and a length of under thread 17 is pulled off from the source of supply. This is herein accomplished by the following mechanism which is illustrated in Figs. 2 and 3.

The rock shaft 37 has at its lower end an arm 39 to which is pivotally connected one end of a link 40, the other end of said link being pivotally connected to a swinging member 41 pivoted at 42 to the turret. Said member 41 is acted on by a spring 44 which normally holds it in the full line position Fig. 2 and thereby normally retains the upper thread cutter 33 in its inoperative position shown in Fig. 7. The member 41 is actuated at the proper time by means associated with the main cam 45 which controls the operation of the machine. This cam has rigid therewith a cam member 46 which is adapted to engage a roll 47 on the end of a lever 48 that is pivoted at 49 to the cam housing 50. This lever 48 extends forwardly from the cam housing, the forward end thereof being bent inwardly as shown at 51.

Figure 10:
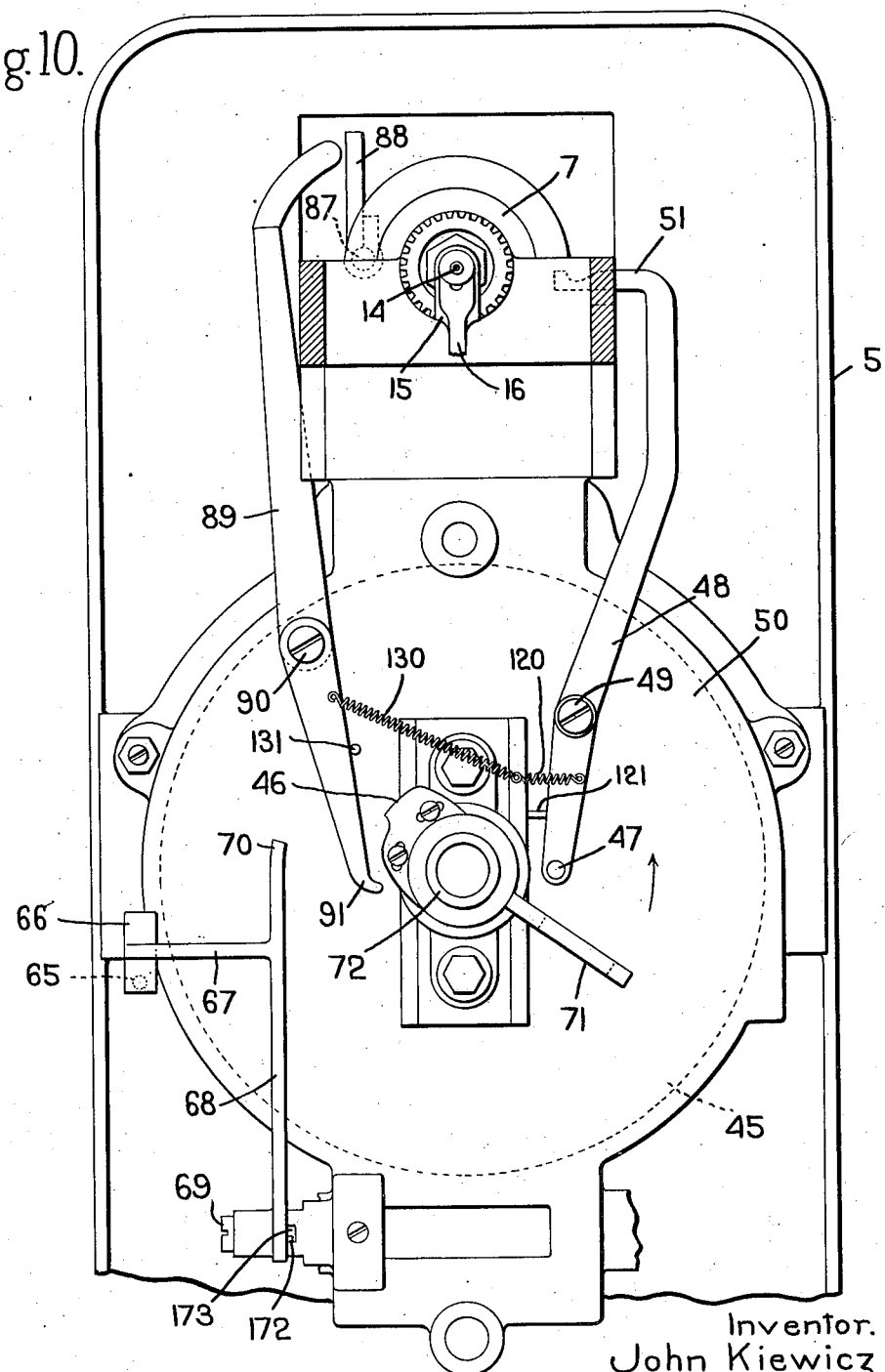
Fig. 10 is an under side view of the bed frame illustrating the means for operating the thread cutters.

When the stitching on the buttonhole is completed and the stitch-forming mechanism comes to rest the turret is in such a relative position that the swinging member 41 is standing opposite the inwardly-bent end 51 of the lever 48 as shown in Fig. 7, and the cam 46 is just about to engage the roll 47 as shown in Fig. 15. The parts are shown in Fig. 10 in the position they occupy after the work-holding means and stitch-forming machanism have been carried relatively to buttonhole cutting position but at the end of the stitching operation and before the relative movement to buttonhole cutting position the cam 46 will have the position shown in Fig. 15. The engagement of the cam 46 with the roll 47 swings the lever 48 thereby moving the end 51 inwardly and causing it to engage the member 41, such movement swinging the member 41 inwardly and actuating the upper-thread trimmer 33. When the cam 46 passes out of engagement with the arm 48 the spring 44 restores the member 41 and cutter 33 to their normal position, while the spring 120 restores the lever 48 to its normal position against a stop 121. It will be understood, of course, that during the sewing around the ends of the buttonhole the turret is rotated thus carrying the swinging member 41 out of line with the end 51 of the lever but the parts are so arranged that at the time when the sewing operation is completed the turret is properly positioned so that the swinging member 41 is in line with the end 51 of the lever 48.

The member 41 also operates to relieve the tension 18 on the under thread 17 and further to pull off a length of under thread. For relieving the tension on the under thread the member 41 is provided with a wedge-shaped upper end 43 which is shaped so that as said member 41 has its vertical swinging movement to actuate the cutter 33 the wedge-shaped end 43 will be crowded between the tension disks 18 and will separate them thus relieving the tension on the under thread.

The pulling off of the length of under thread when the tension is released is accomplished by a pull-off lever 52 which is pivotally mounted on the turret and has at its upper end a pull-off hook 53 situated to engage the under thread between the looper 11 which carries said thread and the throat plate. This under thread pull-off is normally in the position shown in Fig. 7, the under thread 17 passing beneath it and up through the sewing opening 10 in the throat plate. The swinging movement of the member 41 by which the tension is released causes the pull-off member 52 to swing backwardly, during which backward movement the hook 53 engages the under thread and pulls a length through the tension, as seen in Fig. 14, said under thread at this time being attached to the work at the sewing point.

The pull-off arm 52 may be pivotally mounted on the turret in any approved way. As herein shown it has at its lower end a foot 54 which is pivotally mounted on pivot pins 55 carried by the turret. The pull-off arm 52 is acted on by a spring 56 which normally holds it in its inoperative position.

As stated above the pull-off member 52 derives its operative movement from the swinging movement of the member 41. This is accomplished through the medium of a thrust pin 57 which is slidably mounted in the frame of the turret and at one end engages a lug or ear 58 formed on the arm 52 and at the other end is adapted to be engaged by a cam finger 59 formed on the member 41. The cam 59 is so arranged that as the member 41 swings toward the right Fig. 2 the cam will engage the thrust pin 57 and force the latter to the left Fig. 4 thereby pushing the pull-off arm 52 backwardly against the action of the spring 56.

The devices thus far described operate as soon as the stitch-forming mechanism has come to rest and while the stitch-forming mechanism and work-holding means are in the relative position they occupy as the last stitch is formed, to cut one side of the loop of needle thread below the work and to relieve the tension on the under thread 17 and pull off a length of under thread.

After one side of the loop of needle thread has been cut below the work as above described then said needle thread is pulled back through the work thereby leaving a sufficient length of needle thread projecting from the eye of the needle to ensure the proper formation of the first stitch at the next sewing operation. This pulling off of the upper thread is accomplished by a pull-off arm 60 which is carried by and pivotally mounted on the arm 28 which supports the clamping foot 25 and the operation of the pull-off arm 60 occurs simultaneously with the raising of the clamping foot 25 which is necessary as will be presently described to permit the under thread cutter to operate.

The arm 28 carrying the clamping foot 25 extends rearwardly of its pivot 29 as shown at 61, said end 61 being situated beneath the end of a lever 62 which is pivoted at 63 to a stand 64 rising from the bed 5. The rear end of the lever 62 is connected to a thrust rod 65 which extends through an opening in the bed 5, said lower end resting on a table or head 66 having an arm 67 which is secured to a lever 68, the latter being pivoted at 69 to the cam housing 50. The lever 68 is limited in its downward swinging movement by the engagement of a stop pin 172 carried by said lever with one wall of a recess 173 formed in the cam housing. The forward end of the lever 68 is provided with a cam surface 70 which is adapted to be acted on by the portion 171 of an arm 71 that is rigid with the main cam 45 and extends from the boss or hub 72 that depends from the main cam. These parts are so arranged that just after the cam 46 has engaged the roll 47 thereby to actuate the upper-thread cutter 33 as above described, the arm 71 engages the cam surface 70 and raises the lever 68.

During the upward movement of the lever the head or platform 66 engages the push rod 65 and raises the latter thereby rocking the lever 62 and depressing the rear end of the arm 28 thereby raising the clamping foot 25. With this type of machine the relative movement between the stitch-forming mechanism and work-holding means is secured by movement of the frame 4 which carries the stitch-forming mechanism back and forth on the bed 5 and the reason for employing the platform 66 is to provide a surface of sufficient extent so that it will always be in engagement with the push rod 65 in all positions of the frame. During this relative back and forth movement of the frame 4 the end of the lever 62 merely slides back and forth on the end of the lever 61 so that there is always operative engagement between these levers.

The swinging movement of the arm 28 by which the clamping foot 25 is raised serves to actuate the pull-off member 60 and thereby pull the length of upper thread back through the work.

The arm 60 is rigidly secured at its rear end to a head or block 73 which is pivoted on the end 61 of the lever 28 as shown at 74 so that said arm 60 can swing horizontally about its pivot 74.

One of the arms 26 which carries a clamping foot 24 has rigid therewith a cam member 75 situated to engage one side of the block 73, and as the end 61 of the arm 28 is depressed to raise the clamping foot 25 this engagement of the block 73 with the cam 75 swings the arm 60 in a horizontal direction about the pivot 74 as shown in Fig. 18 and during such swinging movement the end 76 of the member 60 engages the needle thread between the needle and the work and by its swinging movement pulls the loop of needle thread back out of the work.

77 indicates a spring acting on the pull-off arm 60 and tending to hold it in its normal postion and 78 is a spring acting on the arm 28 and normally holding it in its lowered position.

The under thread, and stay cord if one is used, are cut or trimmed close to and beneath the work and between the work and the throat plate immediately after the clamping foot 25 is raised. The cutter for cutting the under thread and stay cord is indicated at 79, it having a cutting edge 80 and being pivoted at 81 to one of the clamp plates 23. The cutting edge 80 co-operates with a ledger blade 125 and is located so that it operates in the same transverse plane as that occupied by the clamping foot 25. Hence the necessity of raising the clamp 25 in order to permit the cutter 79 to operate. The cutter 79 is located above the clamp plate 23 but is situated beneath the work, the work overlying the cutter and being clamped thereto during the sewing operation. While the clamping feet 24 occupy positions on opposite sides of the buttonhole yet at their forward ends they terminate slightly in the rear of the buttonhole so that when the buttonhole is completed the point 82 at which the last stitch was formed is in the front of the front edges 83 of the clamps 24 but directly back of the rear edge of the clamp 25. As soon as the clamp 25 is raised after the stitching is completed the cutter 79 is given its thread cutting movement into the dotted line positions Fig. 8, said cutter crowding between the work and the throat plate 9 and engaging the under thread, and the stay cord if one is used, and cutting them against the ledger blade 125 close to the work. The fact that the clamp 25 is raised permits the work to yield upwardly so as to allow the under thread cutter 79 to operate without injury to the work. During this cutting operation the work is still held clamped to the clamp plate by the clamping feet 24 and thus is firmly held in position until after the thread cutting operation is completed.

The cutter member 79 is also actuated from the main cam of the sewing machine through suitable lever arrangement. Said cutter member is provided with an inclined slot 84 in which is received a pin 85 carried by the end of an arm 86 that is fast on a shaft 87 that extends through the clamp plate 23. On its lower end said shaft 87 has rigid therewith an arm 88 which is adapted to be actuated by a lever 89 pivoted to the cam housing at 90. The end 91 of the lever is situated to be engaged by the portion 92 of the arm 71 as the hub 72 of the cam rotates. The engagement of the portion 92 of said arm with the end 91 of the lever 89 will rock said lever, moving the forward end to the right Fig. 10 and causing it to engage the arm 88 which is fast on the rock shaft 87. This turns the rock shaft and thus swings the arm 86 into the dotted line position Fig. 8 thereby swinging the cutter 79 underneath the raised work clamp 25 and directly over the throat plate. During this movement of the cutting edge 80 across the throat plate and the ledger blade 125 the under thread leading to the work, and the stay cord, if one is used, are severed close to the work.

In the present invention it will be noted that while the cutter 79 cuts the under thread between the throat plate and the work yet nevertheless it is situated above the clamp plates, it operating on top of the clamp plates 23 and its cutting action is provided for by making the work clamps with the two clamping feet 24 and an additional clamping foot 25, which latter clamping foot is raised off the work at the time that the cutter operates.

The thread cutter 79 is returned to its normal position by a spring 126 and the lever 89 is returned to its normal position against the stop 131 by a return spring 130 as usual.

While I have illustrated herein a selected embodiment of my invention I do not wish to be limited to the constructional features shown.

I claim:

1. In a sewing machine, the combination with work-clamping means and stitch-forming mechanism movable relative to each other to sew a group of stitches, said stitch-forming mechanism including a throat plate of means to cut the thread between the throat plate and the work at the end of the sewing operation and while the work is clamped in the work-clamping means and also while the work-clamping means and stitch-forming mechanism are in the relative positions they occupy at the time of the formation of the last stitch.

2. In a sewing machine adapted to perform a predetermined sewing operation and then come to rest, the combination with work-clamping means and stitch-forming mechanism movable relative to each other during the sewing operation, said stitch-forming mechanism including a throat plate, of means to cut the thread between the throat plate and the work at the end of the sewing operation and while the work is still held in the work-clamping means and also while the work-clamping means and stitch-forming mechanism are in the relative positions they occupy at the time of the formation of the last stitch.

3. In a sewing machine, the combination with work-holding means and stitch-forming mechanism including a needle and under thread mechanism arranged so that when the stitch-forming mechanism comes to rest a loop of the needle thread is retained by the under thread mechanism, of means to cut the side of the loop of needle thread that leads to the work, and means acting on the needle thread between the needle and the work to pull the severed end of needle thread back through the work.

4. In a sewing machine, the combination with work-holding means and stitch-forming mechanism including a needle and under thread mechanism arranged so that when the stitch-forming mechanism comes to rest a loop of the needle thread is retained by the under thread mechanism, means operating below the work to cut the side of the loop of needle thread that leads to the work, and means acting on the needle thread between the needle and the work to pull the severed end of needle thread back through the work.

5. In a sewing machine, the combination with work-holding means and stitch-forming mechanism including a needle and under thread mechanism arranged so that when the stitch-forming mechanism comes to rest a loop of the needle thread is retained by the under thread mechanism, of means to cut the side of the loop of needle thread that leads to the work, and a pull-off arm adapted to act on the needle thread between the needle and the work to pull the severed end of needle thread back through the work.

6. In a sewing machine, the combination with work-holding means and stitch-forming mechanism including a needle and under thread mechanism arranged so that when the machine comes to rest a loop of the needle tread is retained by the under thread mechanism, means operating beneath the work to cut the side of said needle thread that leads to the work, and means carried by the work-holding means to pull back through the work the severed end of needle thread.

7. In a sewing machine, the combination with work-holding means and stitch-forming mechanism including a needle and under thread mechanism arranged so that when the machine comes to rest a loop of the needle thread is retained by the under thread mechanism, means operating beneath the work to cut the side of said needle thread that leads to the work, and a pull-off arm carried by the work-holding means to pull back through the work the severed end of needle thread.

8. In a sewing machine, the combination with work-holding means and stitch-forming mechanism movable relative to each other, said stitch-forming mechanism including a needle and looper mechanism arranged so that when the machine comes to rest a loop of needle thread is retained by the looper mechanism, a main cam by which the work-holding means and stitch-forming mechanism are moved relatively, means actuated by the cam at the end of the stitching operation to cut the side of the loop of needle thread which leads to the work, and means to pull back through the work the cut end of needle thread.

9. In a sewing machine, the combination with work-holding means and stitch-forming mechanism movable relative to each other, said stitch-forming mechanism including a needle and looper mechanism arranged so that when the machine comes to rest a loop of needle thread is retained by the looper mechanism, a main cam by which the work-holding means and stitch-forming mechanism are moved relatively, means actuated by the cam at the end of the stitching operation to cut the side of the loop of needle thread which leads to the work, while the work-holding means and stitch-forming mechanism are in the position they occupied at the formation of the last stitch, and means to pull back through the work the cut end of needle thread.

10. In a sewing machine, the combination with work-holding means and stitch-forming mechanism movable relative to each other, said stitch-forming mechanism including a needle and looper mechanism arranged so that when the machine comes to rest a loop of needle thread is retained by the looper mechanism, a main cam by which the work-holding means and stitch-forming mechanism are moved relatively, means actuated by the cam at the end of the stitching operation to cut the side of the loop of needle thread which leads to the work, and means carried by the work-holding means to pull back through the work the cut end of needle thread.

11. In a sewing machine, the combination with work-holding means and stitch-forming mechanism movable relative to each other, said stitch-forming mechanism including a needle and looper mechanism arranged so that when the machine comes to rest a loop of needle thread is retained by the looper mechanism, a main cam by which the work-holding means and stitch-forming mechanism are moved relatively, means actuated by the cam at the end of the stitching operation to cut the side of the loop of needle thread which leads to the work while the work-holding means and stitch-forming mechanism are in the position they occupied at the formation of the last stitch, and means carried by the work-holding means to pull back through the work the cut end of needle thread.

12. In a sewing machine, the combination with work-holding means and stitch-forming mechanism including a needle operating from above the work and a looper mechanism beneath the work arranged so that when the stitch-forming mechanism comes to rest a loop of needle thread is retained by the looper mechanism, of a cutter for cutting that side only of the loop leading to the work, a pull-off device separate from the cutter to pull off a length of under thread, and an actuator common to both the cutter and pull-off and by which both are actuated.

13. In a sewing machine, the combination with work-holding means and stitch-forming mechanism including a needle operating from above the work and a looper mechanism beneath the work arranged so that when the stitch-forming mechanism comes to rest a loop of needle thread is retained by the looper mechanism, of a cutter for cutting that side only of said loop leading to the work, a pull-off device separate from the cutter to pull off a length of under thread, and an actuator common to both the cutter and pull-off and by which both are actuated simultaneously.

14. In a sewing machine, the combination with work-holding means and stitch-forming mechanism including a needle and a looper mechanism arranged so that when the stitch-forming mechanism comes to rest a loop of needle thread is retained by the looper mechanism, of a cutter for cutting the side of the loop leading to the work, a pull-off device separate from the cutter to pull off a length of under thread, an actuator common to both the cutter and pull-off and by which both are actuated, and means to pull back through the work the severed end of needle thread.

15. In a sewing machine, the combination with work-holding means and stitch-forming mechanism including a needle and a looper mechanism arranged so that when the stitch-forming mechanism comes to rest a loop of needle thread is retained by the looper mechanism, of a cutter for cutting the side of the loop leading to the work, a pull-off device separate from the cutter to pull off a length of under thread, an actuator common to both the cutter and pull-off and by which both are actuated, and means carried by the work-holding means to pull back through the work the severed end of needle thread.

16. In a sewing machine, the combination with work-holding means and stitch-forming mechanism including a needle and looper devices arranged so that when the stitch-forming mechanism comes to rest a loop of needle thread is retained by the looper devices, of an under thread tension, means to release the tension when the stitch-forming mechanism comes to rest, and means actuated by the tension-releasing means to cut the needle thread and pull off a length of under thread.

17. In a sewing machine, the combination with work-holding means and stitch-forming mechanism including a needle and looper devices arranged so that when the stitch-forming mechanism comes to rest a loop of needle thread is retained by the looper devices, of an under thread tension, means to release the tension when the stitch-forming mechanism comes to rest, means actuated by the tension-releasing means to cut the needle thread and pull off a length of under thread, and other means to cut the under thread close to the work.

18. In a sewing machine, the combination with work-holding means and stitch-forming mechanism including a needle and looper devices arranged so that when the stitch-forming mechanism comes to rest a loop of needle thread is retained by the looper devices, of a tension for the under thread, a cutter for cutting the side of the needle thread loop leading to the work, a pull-off for pulling off a length of under thread, tension-releasing means, and means actuated thereby to operate the cutter and the pull-off.

19. In a sewing machine, the combination with work-holding means and stitch-forming mechanism including a needle and looper devices arranged so that when the stitch-forming mechanism comes to rest a loop of needle thread is retained by the looper devices, of a tension for the under thread, a cutter for cutting the side of the needle thread loop leading to the work, a pull-off for pulling off a length of under thread, tension-releasing means, means actuated thereby to operate the cutter and the pull-off, and other means to cut the under thread after it has been pulled.

20. In a buttonhole sewing machine, the combination with stitch-forming mechanism, of work-holding means including clam plates, two clamping feet for clamping the work at the sides of the buttonhole, and a third clamping foot for engaging the work adjacent the buttonhole where the last stitch is formed, means operative at the end of the sewing operation to release the third clamping foot before the other clamping feet are released, and means to cut the thread beneath the work after said third clamping foot has been released and while the work is held by the other clamping feet.

21. In a buttonhole sewing machine, the combination with stitch-forming mechanism, of work-holding means including clamp plates, two clamping feet for clamping the work to the clamp plates either side of the buttonhole, and a third clamping foot for engaging the work at the end of the buttonhole adjacent where the last stitch is formed, a throat plate beneath the work, means to release the third clamping foot at the end of the sewing operation and before the other clamping feet are released, and means operating to cut the thread between the throat plate and the work after the third clamping foot has been released and while the work is held by the other clamping feet.

22. In a buttonhole sewing machine, the combination with stitch-forming mechanism, of work-holding means including clamp plates, two clamping feet for clamping the work to the clamp plates either side of the buttonhole, and a third clamping foot for engaging the work at the end of the buttonhole adjacent where the last stitch is formed, a throat plate beneath the work, means to release the third clamping foot at the end of the sewing operation and before the other clamping feet are released, and means operating above the clamp plates to cut the thread between the throat plate and the work after the third clamping foot has been released and while the work is held by the other clamping feet.

23. In a buttonhole sewing machine, the combination with stitch-forming mechanism, of work-holding means including clamp plates, two clamping feet for clamping the work at the sides of the buttonhole, and a third clamping foot for engaging the work adjacent the buttonhole where the last stitch is formed, means operative at the end of the sewing operation to release the third clamping foot before the other clamping feet are released, and means operative above the clamp plates and beneath the work to cut the thread after the third clamping foot is raised but while the work is held by the other clamping feet.

24. In a buttonhole sewing machine, the combination with stitch-forming mechanism including a needle and looper mechanism arranged so that when the stitch-forming mechanism comes to rest a loop of needle thread is retained by the looper mechanism, of work-holding means including clamping plates and two clamping feet engaging the work on the sides of the buttonhole and a third clamping foot engaging the work at the end of the buttonhole where the last stitch is formed, means operative at the end of the sewing to cut the side of the needle thread loop leading to the work, means to raise the third clamping foot while the other clamping feet continue to hold the work, and means operated by the raising movement of said third clamping foot to pull the cut end of needle thread back through the work.

25. In a buttonhole sewing machine, the combination with stitch-forming mechanism including a needle and looper mechanism arranged so that when the stitch-forming mechanism comes to rest a loop of needle thread is retained by the looper mechanism, of work-holding means including clamping plates and two clamping feet engaging the work on the sides of the buttonhole and a third clamping foot engaging the work at the end of the buttonhole where the last stitch is formed, means operative at the end of the sewing to cut the side of the needle thread loop leading to the work, means to raise the third clamping foot while the other clamping feet continue to hold the work, means operated by the raising movement of said third clamping foot to pull the cut end of needle thread back through the work, and means to cut the under thread.

26. In a buttonhole sewing machine, the combination with stitch-forming mechanism including a needle and looper mechanism arranged so that when the stitch-forming mechanism comes to rest a loop of needle thread is retained by the looper mechanism, of work-holding means including clamping plates and two clamping feet engaging the work on the sides of the buttonhole and a third clamping foot engaging the work at the end of the buttonhole where the last stitch is formed, means operative at the end of the sewing to cut the side of the needle thread loop leading to the work, means to raise the third clamping foot while the other clamping feet continue to hold the work, means operated by the raising movement of said third clamping foot to pull the cut end of needle thread back through the work, and means operating above the clamp plates but below the work to cut the under thread.

27. In a sewing machine adapted to perform a predetermined sewing operation and then come to rest, the combination with work-clamping means and stitch-forming mechanism movable relative to each other during the sewing operation and having a further relative movement subsequent to the sewing operation, said stitch-forming mechanism including a throat plate, of means to cut the thread between the work and the throat plate at the end of the sewing operation and while the work is still clamped but before the stitch-forming mechanism and work-holding means have said further relative movement.

28. In a buttonhole sewing machine, the combination with work-clamping means, of stitch-forming mechanism having upper thread handling mechanism and under thread mechanism, said work-clamping means and stitch-forming mechanism being movable relative to each other to sew a group of stitches and having a further relative movement subsequent to the sewing operation to carry the parts from sewing to buttonhole cutting position, of means to cut the upper thread, other means to cut the under thread beneath the work at the end of the sewing operation and while the work is clamped in the work-clamping means and also while said work-clamping means and stitch-forming mechanism are in the relative positions they occupy at the time of the formation of the last stitch and before the further relative movement occurs.

29. In a sewing machine, the combination with work-clamping means, of stitch-forming mechanism including upper thread mechanism and under thread mechanism, and also including a throat plate, of means to cut the upper thread, means to cut the under thread between the throat plate and the work at the end of the sewing operation and while the work is clamped in the work-clamping means and also while the work-clamping means and stitch-forming mechanism are in the relative positions they occupy at the time of the formation of the last stitch.

30. In a sewing machine, the combination with work-holding means, of stitch-forming mechanism including a needle operating from above the work and under thread mechanism arranged so that when the stitch-forming mechanism comes to rest a loop of the needle thread is retained by the under thread mechanism, said stitch-forming mechanism also including a throat plate, means to cut the under thread between the work and the throat plate at the end of the stitching operation, means to cut the side of the loop of needle thread that leads to the work, and means to pull the severed end of needle thread back through the work.

31. In a sewing machine, the combination with work-holding means, of stitch-forming mechanism including a needle operating from above the work and under thread mechanism arranged so that when the stitch-forming mechanism comes to rest a loop of the needle thread is retained by the under thread mechanism, said stitch-forming mechanism also including a throat plate, means to cut the under thread between the work and the throat plate at the end of the stitching operation, means to cut one side of the loop of needle thread below the throat plate, and means to pull the severed end of needle thread back through the work.

32. In a sewing machine, the combination with work-holding means, of stitch-forming mechanism including a needle operating from above the work and under thread mechanism arranged so that when the stitch-forming mechanism comes to rest a loop of the needle thread is retained by the under thread mechanism, said stitch-forming mechanism also including a throat plate, means to cut the under thread between the work and the throat plate at the end of the stitching operation, means to cut that side of the loop of needle thread only which leads to the last stitch, and means to pull the severed end of needle thread back through the work.

33. In a sewing machine, the combination with work-holding means, of stitch-forming mechanism including a needle operating above the work, under thread mechanism beneath the work arranged so that when the stitch-forming mechanism comes to rest a loop of needle thread is retained by the under thread mechanism, a cutter for cutting that side only of the loop of needle thread leading to the last stitch, a pull-off device separate from the cutter to pull off a length of under thread, an actuator common to both the cutter and pull-off by which they are actuated, and means to cut the under thread.

34. In a sewing machine, the combination with work-clamping means, of stitch-forming mechanism including a needle operating from above the work, under thread mechanism and a throat plate, said stitch-forming mechanism being arranged so that when it comes to rest at the completion of the sewing a loop of needle thread is retained by the under thread mechanism, a cutter for cutting the side of said loop leading to the last stitch beneath the throat plate, a pull-off device to pull off a length of under thread, and means to cut the under thread between the throat plate and the work while the work is clamped in the work-clamping means.

35. In a buttonhole sewing machine adapted to perform a predetermined sewing operation and then come to rest, the combination with stitch-forming mechanism and work-holding means movable relative to each other during the sewing operation and having a further relative movement subsequent to the sewing operation to carry the parts from sewing to buttonhole cutting position, said work-holding means including clamp plates and clamping feet to clamp the work thereon, and means operating above the clamp plates to cut the thread beneath the work at the end of the sewing operation and while the work is held clamped between the clamp plates and the clamping feet and before the work-holding means and stitch-forming mechanism have said further relative movement.

In testimony whereof I have signed my name to this specification.

JOHN KIEWICZ.